CELLULOSE DERIVATIVES AND THEIR APPLICATION FOR COATING AGENTS

Kenji Naito, Osaka, Hiroaki Nomura, Nishinomiya, Yasuo Noguchi, Minoo, and Takehiko Kajiura, Osaka, Japan, assignors to Takeda Chemical Industries, Ltd., Osaka, Japan
No Drawing. Filed May 27, 1964, Ser. No. 370,724
Claims priority, application Japan, June 3, 1963, 38/29,128; Sept. 6, 1963, 38/47,498
8 Claims. (Cl. 260—226)

The present invention relates to a method for the production of cellulose derivatives, and more particularly, to a method for the production of cellulose derivatives which comprises reacting acyl cellulose with 1-(N,N-disubstituted-amino)-2,3-epoxypropane of the formula:

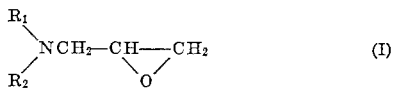
(I)

wherein each of $R_1$ and $R_2$ is alkyl, cycloalkyl, aralkyl, aryl or carboxymethyl, and $R_1$ and $R_2$ may form a heterocyclic ring together with the adjacent nitrogen atom.

The cellulose derivatives produced by the method of the present invention are distinguished by their moisture-proofing, water-proofing and strongly tunicate properties, non-toxicity, and high solubility in acidic pH. Moreover, the procedure for coating medicines or chemicals with the cellulose derivatives is very simply carried out, and therefore, the cellulose derivatives are conveniently usable as a coating agent for the medicines or chemicals. Coating agents such as sugar and gelatin have heretofore been employed in protection of medicines or chemicals from denaturation by moisture or air oxidation. Nowadays high polymer coating agents such as basic vinyl compounds have also been applied to coating agents for medicines and chemicals. It may be indeed that some of the hitherto known coating agents are distinguished by their moisture-proofing, water-proofing and strongly tunicate properties, and solubility in acidic pH, but even those coating agents are not free from disadvantages such as troublesome procedures for coating medicines or chemicals with the agents, or such as penetrability to light.

Although many attempts have been made to overcome the aforesaid disadvantages, none, as far as the present inventors are aware, has been entirely successful when applied to practical use.

It is an object of the present invention to provide such new cellulose derivatives. Another object of the present invention is to provide new coating agents for medicines or chemicals that are free from the above-mentioned disadvantages. The present invention also contemplates providing a method for the production of new cellulose derivatives.

Other objects and advantages will become apparent from the following description.

The present new cellulose derivatives can be prepared by reacting acyl cellulose with 1-(N,N-disubstituted amino)-2,3-epoxypropane of the foregoing Formula I.

The alkyl group represented by $R_1$ or $R_2$ in the foregoing Formula I, one of the starting materials of the present invention, may, for example, be methyl, ethyl, propyl, butyl or the like. As the cycloalkyl, aralkyl, and aryl group represented by $R_1$ or $R_2$ there may be cyclohexyl, benzyl, phenethyl, phenyl, etc. And $R_1$ and $R_2$ may form a heterocyclic ring together with the adjacent nitrogen atom such as piperidino or pyrrolidino. The groups respectively represented by $R_1$ or $R_2$ may be the same as or different from each other.

As acyl cellulose, another starting material of the present invention, any celluloses in which the hydroxyl groups are acylated may be employed. Among the acyl groups to be substituted in place of hydrogen atom or atoms, there may, for example, be enumerated acetyl, propionyl, butyryl, or benzoyl. The acyl groups in the acyl cellulose may be the same as or different from each other.

Generally, the reaction proceeds smoothly in an organic solvent, or in a mixture of two or more organic solvents. As the solvent, there may be used ethers such as diethyl ether or dioxane, hydrocarbons such as benzene, toluene or xylene, ketones such as acetone or methyl ethyl ketone, esters such as ethyl acetate or methyl acetate, etc.

The amount of the solvent or solvents may be chosen suitably according to circumstances. For instance, in case acetyl cellulose as one of the starting materials, and dioxane as the reaction solvent are put into use, the amount of dioxane is preferred to be 3–10 times by weight relative to acetyl cellulose. When acyl cellulose in which the degree of acylation is high, in other words, cellulose in which a greater part or all of the hydroxyl groups are acylated, is used as one of the starting materials in the method of the present invention, a little amount of water must be present in the reaction system. That is to say, is it necessary that the acyl group or groups in the acyl cellulose are partially hydrolyzed to give free hydroxyl group or groups in proper degree per anhydroglucose unit, since only free hydroxyl group or groups in cellulose take part in the reaction with 1-(N,N-disubstituted amino)-2,3-epoxypropane.

The reaction conditions such as reaction temperature and reaction time must be selected suitably in accordance with the amount of the starting materials, acylation degree of acyl cellulose and the amount of the solvent used and water. For example when 40%-acetyl cellulose which is commercially available and most common type of acetyl celluloses and 1-(N,N-dialkylamino)-2,3-epoxypropane are allowed to react in the presence of a small amount of water in dioxane, the reaction comes to an end in about 5–20 hours by heating at 100–200° C.

Generally, in the present invention, the reaction time becomes shorter by heating, and it may be carried out at elevated temperature above the boiling point of the solvent used in such a vessel as an autoclave to make the reaction time shorter. When acyl celluloses containing less than about 1.8 acyl groups per anhydroglucose unit are used as the starting material in the present invention, the reaction system should be dried in advance of the reaction, since no more deacylation reaction is desired in this case. And in the case of the absence of water, the reaction may be promoted by the addition of a suitable catalyst. The catalyst may, for example, be boron trifluoride, tin tetrachloride, zinc chloride, aluminum trichloride, etc., or a mixture consisting of two or more of these catalysts. Since such alkalis as sodium hydroxide and potassium hydroxide are effective for activation of an epoxypropane ring, and are inclined to promote deacylation of acyl cellulose, these alkalis may be used to promote deacylation of acyl cellulose when acyl cellulose in which the degree of acylation is high is employed.

As detailed above, by the present invention, various cellulose derivatives in which the hydrogen atoms of the hydroxyl groups are substituted by N,N-disubstituted aminohydroxypropyl group can be obtained by suitably choosing such factors as acylation degree in acyl cellulose of a starting material, the amount of another starting material, the amount of water in the case of the use of highly acylated cellulose, and reaction conditions, i.e., temperature and reaction time.

Substitution degree of N,N-disubstituted aminohydroxypropyl groups may be estimated by analytically determining nitrogen content in the product.

When the epoxide moiety of 1-(N,N-disubstituted-amino)-2,3-epoxypropane splits in the course of the reaction to form an ether-bonding with —OH group of acyl cellulose, the following two cases are assumed:

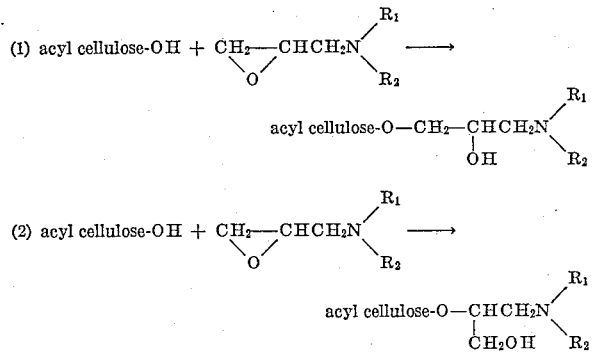

The product in the method actually contains both

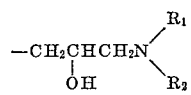

and

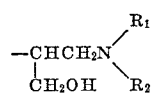

However, since there is present the group

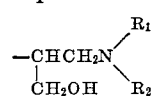

only in low percentage, the fact is that Reaction (1) takes place predominantly in the present method, and Reaction (2) in low rate.

In the next place, 3-(N,N-disubstituted-amino)-2-hydroxpropyl group

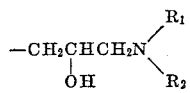

content per anhydroglucose unit and acetyl content per anhydroglucose unit in the present products are, for example, shown in the following table for the purpose of giving those skilled in the art a better understanding of the present products:

Purification of the reaction products can be carried out by methods, per se well known in the art, for example by reprecipitating method.

Generally, thus obtained cellulose derivatives are soluble in such organic solvents as benzene, acetone, methanol, ethanol, dioxane, chloroform, etc., are hardly soluble in water, and are easily soluble in diluted aqueous solution of hydrochloric acid. Accordingly, the present cellulose derivatives form a water-proof coat but the coat is easily soluble in acid such as gastric juice. Moreover, said cellulose derivatives are almost non-toxic at oral administration of 5,000 milligrams per kilogram of the body weight in mice. Therefore the present cellulose derivatives can be applied to medicines or chemicals as coating agents. Preferably the cellulose derivatives of which the nitrogen content is about 1–5% are suitable as the coating agents for medicines or chemicals.

As detailed above, the cellulose derivatives prepared by the method of the present invention are distinguished by their moisture-proofing, water-proofing and strongly tunicate properties, non-toxicity and solubility in gastric juice, and they are free from such a disadvantage as mutual adhesion of tablets in the course of pan-coating procedures and therefore the procedure for coating medicines or chemicals with the present cellulose derivatives can smoothly be carried out. The coating of medicines or chemicals with the present cellulose derivatives can be carried out by methods per se well known in the art, for example by spraying the solution of the present cellulose derivatives over tablets, pills, granules or crystals of medicines or chemicals, or by putting medicines or chemicals in capsules made of the cellulose derivatives.

The following examples represent presently-preferred illustrative embodiments of the invention.

EXAMPLE 1

To a solution of 17.6 grams of 40%-acetyl cellulose (acetyl content 40%) in a mixture of 97.5 milliliters of dioxane and 1.95 milliliters of water, are added 27.3 grams of 1-(N,N-dibutylamino)-2,3-epoxypropane. The mixture is heated at 160° C. in an autoclave for 6 hours. The mixture is purified to obtain acetyl cellulose containing N,N-dibutylamino-hydroxypropyl groups. The acetyl cellulose is soluble in 6 N-hydrochloric acid. No change is observed when the acetyl cellulose is dipped in water for a week. Nitrogen content of the acetyl cellulose derivatives is 1.73%.

EXAMPLE 2

The cellulose derivatives mentioned in the Table 1 are obtained in a manner similar to that described in Example 1.

TABLE 1

| Reaction Conditions | | | | | | Yield | Products | | |
|---|---|---|---|---|---|---|---|---|---|
| 40% acetyl cellulose (grams) | 1-(N,N-dibutylamino)-2,3-epoxypropane (grams) | Dioxane (solvent) (milliliters) | Water (milliliters) | Temperature (° C.) | Reaction time (hours) | Percent (grams) | Acetyl content (percent) | Nitrogen content (percent) | Intrinsic viscosity, in dioxane, 25° C. |
| 17.6 | 27.3 | 97.5 | 1.95 | 180 | 9 | 24.0 | -------- | 2.66 | -------- |
| 17.6 | 27.3 | 130 | 3.9 | 180 | 9 | 24.9 | -------- | 2.33 | -------- |
| 42.5 | 59.2 | 236 | 4.7 | 180 | 9 | 49.0 | 27.2 | 1.54 | 1.44 |
| 17.6 | 36.4 | 97.5 | 1.95 | 180 | 9 | 24.8 | 23.5 | 2.16 | 1.33 |
| 574.6 | 1,201.6 | 2,707 | 51.3 | 180 | 18 | 643 | 14.6 | 2.65 | 1.25 |

TABLE

| Total carbon atoms of two substituents $R_1$ and $R_2$ in the products | $-CH_2CHCH_2N\begin{smallmatrix}R_1\\ \\R_2\end{smallmatrix}$ with OH, number per anhydroglucose unit | Acetyl group number per anhydroglucose unit |
|---|---|---|
| 2–5 | 0.2–1.5 | 0.49–2.50 |
| 6–10 | 0.25–2.5 | 0.30–2.50 |
| 12 | 0.5–2.5 | 0.2–2.50 |

EXAMPLE 3

To a solution of 23.4 grams of 30%-acetyl cellulose (acetyl content 30%) in 360 milliliters of anhydrous dioxane, are added 55 grams of 1-(N,N-diethylamino)-2,3-epoxypropane. The mixture is heated at 150° C. in an autoclave for 6 hours. After completion of the reaction, hexane is added to the reaction mixture. The resulting product is reprecipitated three times from a mixture of dioxane and hexane to obtain 24.4 grams of the product melting at about 330° C. Nitrogen content of the product is 2.2%. 3-(N,N-diethylamino)-2-hydroxypropyl per anhydroglucose unit is 0.45.

EXAMPLE 4

The celulose derivatives mentioned in the Table 2 are obtained in a manner similar to that described in Example 3.

Cellulose acetate methylcyclohexylamino:
Hydroxypropylether (nitrogen content 2.0%; molecular weight 7,500–15,000) _____gms__ 8.0
Benzene _____cc__ 50.0
Ethyl alcohol, absolute, q.s. to 100 cc.

The same process steps are employed as in Example 5 to prepare the coated tablets.

TABLE 2

| 30% acetyl cellulose (grams) | Starting Materials $R_1\!\!\diagdown\!\!NCH_2\!\!-\!\!CH\!\!-\!\!CH_2$ $R_2\!\!\diagup\quad\diagdown\!\!O\!\!\diagup$ | Dioxane (Solvent) (milliliters) | Temperature (° C.) | Reaction Time (hours) | Nitrogen Content of the product (percent) | Melting Point (° C.) |
|---|---|---|---|---|---|---|
| | (grams) | | | | | |
| 23.3 | $R_1$: ethyl / $R_2$: ethyl / 47.5 | 180 | 100 | 12 | 1.1 | >330 |
| 23.3 | $R_1$: ethyl / $R_2$: ethyl / 55.0 | 180 | 150 | 6 | 2.97 | >330 |
| 23.3 | $R_1$: ethyl / $R_2$: ethyl / 55.0 | 180 | 150 | 12 | 3.47 | >330 |
| 23.3 | $R_1(R_2)$: piperidino / 42.1 | 360 | 150 | 6 | 2.68 | >330 |
| 23.3 | $R_1$: propyl / $R_2$: propyl / 31.4 | 270 | 150 | 6 | 1.87 | >330 |
| 23.3 | $R_1$: n-butyl / $R_2$: n-butyl / 55.6 | 350 | 150 | 6 | 1.40 | >330 |
| 23.3 | $R_1$: n-butyl / $R_2$: n-butyl / 55.6 | 270 | 150 | 12 | 1.70 | >330 |
| 23.3 | $R_1$: n-butyl / $R_2$: n-butyl / 55.6 | 270 | ¹150 | 6 | 3.08 | >330 |
| 23.3 | $R_1$: methyl / $R_2$: cyclohexyl / 50.6 | 180 | 150 | 6 | 1.72 | >330 |
| 23.3 | $R_1$: cyclohexyl / $R_2$: cyclohexyl / 67.6 | 360 | 150 | 6 | 1.17 | ²290–295 |
| 23.3 | $R_1$: methyl / $R_2$: benzyl / 48.0 | 110 | 180 | 6 | 2.74 | >330 |
| 23.3 | $R_1$: methyl / $R_2$: phenyl / 44.0 | 110 | 180 | 6 | 2.39 | >330 |

¹ Catalyst: AlCl₃, 0.5 gram.
² Decomposition.

EXAMPLE 5

A tablet coating solution is made up according to the following formula:

Cellulose acetate diethylamino:            Grams
    Hydroxypropyl ether (nitrogen content 1.8% molecular weight 20,000–50,000) _____ 8.0
Dioxane, q.s. to 100 cc.

The cellulose derivative is dissolved in the dioxane with aid of agitation. The tablets, which have a diameter of 8.0 mm. and a weight 200 mgs., are put into a coating pan. The cellulose derivative-dioxane mixture is applied to a moving bed of tablets in a coating pan by pouring the mixture uniformly over the tablet surfaces. As the tablets rotate, the solvent evaporates leaving a thin, dry, hard film on the tablets. A period of about 8 minutes is allowed for said film to dry and immediately thereafter a further amount of the mixture is uniformly distributed over the tablet surfaces and the mixture is allowed to dry. This process is repeated several times to apply 10 mgs. transparent, glossy film on a tablet.

The disintegration time of the coated tablets is 20–30 minutes in the artificial gastric fluid and more than 3 hours in dist. water when testing by the U.S. Pharmacopoeia tablet disintegration apparatus.

EXAMPLE 6

A tablet coating solution is made up according to the following formula:

EXAMPLE 7

A tablet coating solution is made up according to the following formula:

Cellulose acetate dibutylamino:            Gms.
    Hydroxypropylether (nitrogen content 2.3%; molecular weight 20,000–50,000 _____ 5.0
Acetone, q.s. to 100 cc.

The cellulose derivative is dissolved in the acetone with aid of agitation. The tablets coated are charged in a fluidizing coating apparatus. The temperature of the blowing air is between 55° C. to 60° C. The cellulose derivative-acetone mixture is applied to the fluidizing tablets in a tower by spraying the mixture uniformly over the tablet surfaces. The solvent is evaporated rapidly by the blowing air and leaves a thin, dry, glossy film on the tablets. The process is continued until 10 mgs. film is applied on a tablet.

EXAMPLE 8

A tablet coating solution is made up according to Example 5 but with a cellulose derivative of the following formula: Cellulose acetate dicyclohexylamino: hydroxypropylether (nitrogen content 1.17%; molecular weight 4,000–6,000).

The cellulose derivative is dissolved in the acetone with aid of agitation. Thereafter the same process steps are employed as in Example 5 to prepare the coated tablets.

Having thus disclosed the invention, what is claimed is:

1. As a coating agent, cellulose derivative containing about 0.2 to about 2.50 acyl groups selected from the class consisting of lower alkylcarbonyl and phenylcarbonyl per anhydroglucose unit and the following (N,N-disubstituted-amino) hydroxypropyl groups:

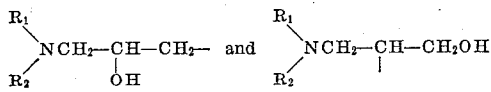

wherein each of $R_1$ and $R_2$ independently is a member selected from the group consisting of alkyl having from 1 to 4 carbon atoms, cyclohexyl, phenyl (lower) alkyl and phenyl, and wherein $R_1$ and $R_2$ together with the adjacent N atom alternatively represent a member selected from the group consisting of piperidino and pyrrolidino, said cellulose derivative having from 0.2 to 2.50 of the above-prescribed (N,N-disubstituted-amino) hydroxypropyl groups per anhydroglucose unit, and the average molecular weight of said cellulose derivative being from about 2000 to about 70,000.

2. The cellulose derivatives as claimed in claim 1, wherein the acyl is acetyl.

3. The cellulose derivatives as claimed in claim 1, wherein the acyl is acetyl and each of $R_1$ and $R_2$ is alkyl having from 1 to 4 carbon atoms.

4. The cellulose derivatives as claimed in claim 1, wherein the acyl is acetyl, $R_1$ is methyl and $R_2$ is benzyl.

5. The cellulose derivatives as claimed in claim 1, wherein the acyl is acetyl, $R_1$ is methyl and $R_2$ is phenyl.

6. The cellulose derivatives as claimed in claim 1, wherein the acyl is acetyl, $R_1$ is methyl and $R_2$ is carboxymethyl.

7. The cellulose derivatives as claimed in claim 1, wherein the acyl is acetyl, and $R_1$ and $R_2$ form piperidino together with the nitrogen atom.

8. The cellulose derivatives as claimed in claim 1, wherein the acyl is acetyl, and each of $R_1$ and $R_2$ is n-butyl.

References Cited

UNITED STATES PATENTS

| | | | |
|---|---|---|---|
| 2,876,217 | 3/1959 | Paschall | 260—233.3 |
| 3,067,152 | 12/1962 | Fukushima et al. | 260—17.4 |
| 3,189,459 | 6/1965 | Burness | 260—348 |
| 2,853,420 | 9/1958 | Lowey | 167—82 |

DONALD E. CZAJA, *Primary Examiner.*

LEON J. BERCOVITZ, *Examiner.*

R. W. MULCAHY, *Assistant Examiner.*